（12）United States Patent
Brede et al.

(10) Patent No.: US 6,946,608 B2
(45) Date of Patent: Sep. 20, 2005

(54) PYROMECHANICAL BATTERY POLE DISCONNECT ELEMENT

(75) Inventors: Uwe Brede, Fuerth (DE); Uwo Albrecht, Nuremberg (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/826,384

(22) Filed: Apr. 19, 2004

(65) Prior Publication Data

US 2005/0008929 A1 Jan. 13, 2005

(30) Foreign Application Priority Data

Apr. 17, 2003 (DE) .......................... 103 17 757
Aug. 19, 2003 (DE) .......................... 103 37 980

(51) Int. Cl.[7] .............................................. H01H 85/00
(52) U.S. Cl. ..................... 200/61.08; 337/279; 180/271
(58) Field of Search .............. 200/61.08; 337/279–283; 180/271, 279; 429/7, 115, 116

(56) References Cited

U.S. PATENT DOCUMENTS 3,848,100 A  * 11/1974 Kozorezov et al. ...... 200/61.08
4,224,487 A  *  9/1980 Simonsen ................. 200/61.08
5,504,288 A  *  4/1996 Morin ....................... 200/83 P
5,793,275 A  *  8/1998 Iversen ........................ 337/273
5,877,563 A  *  3/1999 Krappel et al. ............. 307/10.1
6,194,988 B1 *  2/2001 Yamaguchi et al. ........ 337/157
6,232,568 B1    5/2001 Hasegawa et al.
6,720,858 B2 *  4/2004 Kaltenborn et al. ........ 337/279

FOREIGN PATENT DOCUMENTS

EP      0936647       8/1999
FR      2775539       9/1999

* cited by examiner

Primary Examiner—K. Richard Lee
(74) Attorney, Agent, or Firm—Scott A. McBain

(57) ABSTRACT

A pyromechanical battery pole disconnect element, includes a housing (1) in which an electrical conductor is located, a pyrotechnic active element (14) including a breaking piston with a disconnect element (7) to sever the electrical conductor at an isolating point (11), and a pyrotechnic charge to drive the disconnect element (7). All of the current-conducting components except the active element (14) are combined to form a one-piece battery terminal clamp element (5).

9 Claims, 3 Drawing Sheets

PYROMECHANICAL BATTERY POLE DISCONNECT ELEMENT

BACKGROUND OF THE INVENTION

The invention relates to a pyromechanical battery pole disconnect element

Pyromechanical battery pole disconnect elements for severing cables, stranded cables, etc. are known in the art. The fundamental principle involves a piston which is driven by a pyrotechnic element generating a propellant gas, whereby a cutter, knife blade, or punch element is located on the operative side of the piston. However, these pyromechanical disconnect elements interact in a fundamental way with the surrounding installation geometry. As a rule, the conductors and the battery terminal clamps mounted on the battery pole are composed of multiple components, an arrangement that makes assembly difficult. Another problematic aspect occurs when thick cable strands are clamped onto the current leads, whereby it is necessary, due to the low-resistance requirement, to attach these cable strands to the current leads using extremely strong terminal screws. When a battery terminal clamp of this type is situated on the battery pole, it is possible for significant mechanical vibrational loads caused by vibrations and shocks from the vehicle to act on these pole terminal clamps. As a result, the conductor may break.

SUMMARY OF THE INVENTION

The goal of the invention is therefore to construct a complete conductor, as the battery terminal clamp, in such a way that can be inserted into an armor housing and is kept clear of external mechanical loads at the isolating point. An additional goal according to the invention is to be able to install the pyrotechnic disconnect element and the conductor within a battery terminal clamp housing that is both simple and very securely attached.

According to the invention, this goal is achieved by combining all the current-conducting components except the active element to form a one-piece battery terminal clamp element.

A preferred embodiment is characterized in that the battery terminal clamp element has a clamping device for connection to the battery terminal and in that two arms oriented essentially at right angles to each other extend from the clamping device; in that an isolating point is located on the first arm, and beyond the isolating point and opposite the clamping device a first attachment element is located, which attachment element serves to connect to the systems to be disconnected in an emergency; and in that a second attachment element is located on the second arm and serves to connect to the systems to be disconnected in an emergency.

The housing advantageously has bracing ribs and/or link segments, and the battery terminal clamp element and active element can be inserted into these bracing ribs and/or link segments.

In order to prevent elements from falling out, an enlarged segment is preferably located on the first arm of the battery terminal clamp element between the isolating point and the first attachment element, the enlarged segment being located or pinched between the ribs in the housing.

In a preferred embodiment, the second attachment element is a support screw, and the first attachment element is an attachment hole.

In a preferred embodiment, only the attachment elements protrude from the battery terminal element out of the housing.

The arms of the battery terminal clamp element are advantageously in the form of a ribbon.

To provide reinforcement, the housing of the battery pole disconnect element is preferably fabricated out of a fiber-reinforced plastic.

The invention thus proposes that the complete current-collection terminal, including the pyromechanical isolating point, be inserted into a special support housing in such a way that the internal armoring link segments support the one-piece battery terminal clamp with the isolating point and the pyrotechnic active element such that the entire assembly is accommodated as a compact module within an enclosed housing.

DETAILED DESCRIPTION OF THE INVENTION

The following discussion explains the invention in more detail based on the figures.

Figure 1:
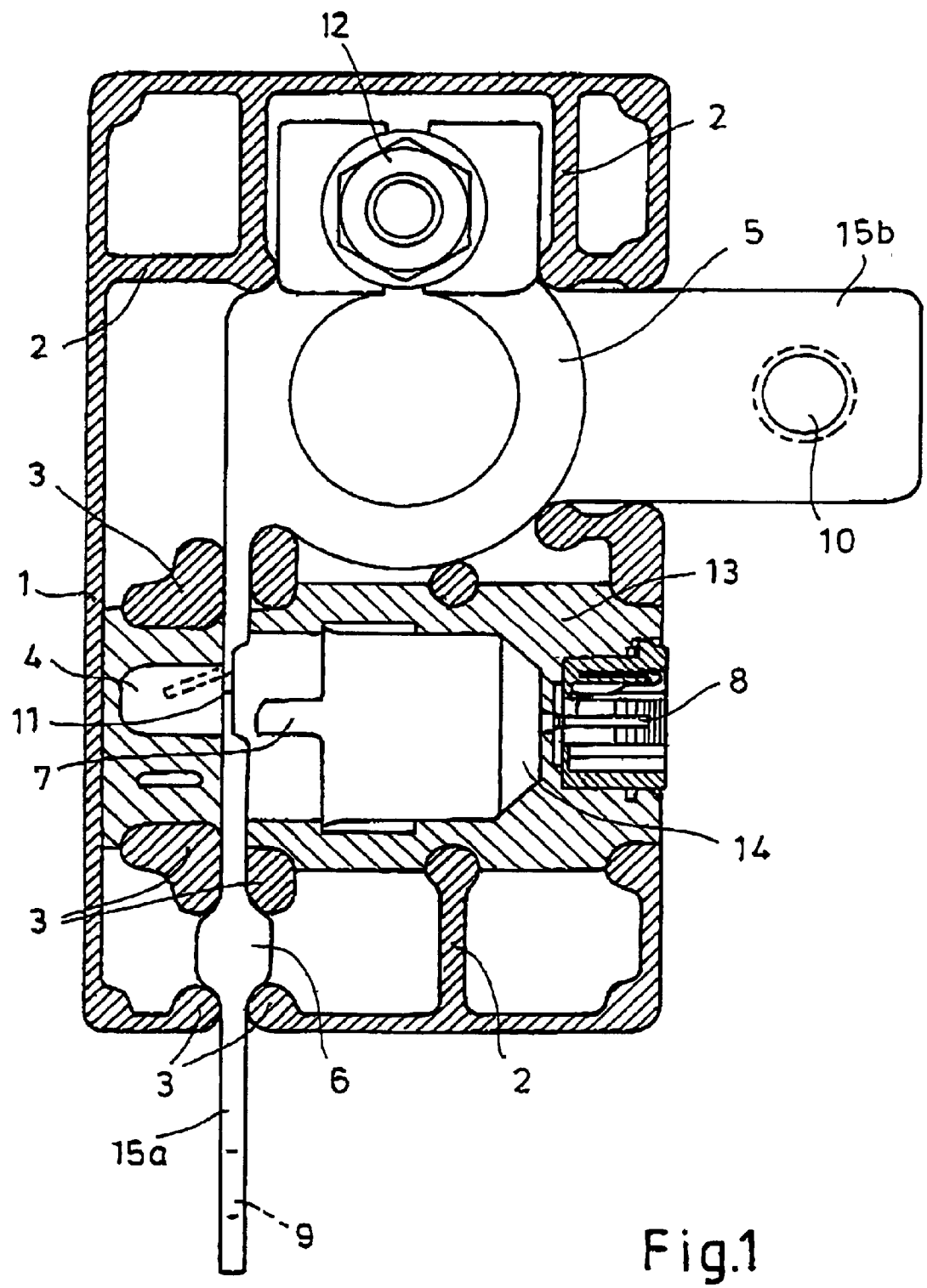
FIG. 1 is a section through the pyromechanical battery pole disconnect element of the present invention seen from above.

FIG. 1 is a section through the pyromechanical battery pole disconnect element seen from above. Bracing elements of different kinds 2, 3, are located within a fiber-reinforced plastic housing 1. These bracing elements or link segments are arranged so as to be able to accommodate the complete battery terminal element 5 by insertion. At the same time, the active element 14 with the disconnect element 7 located in a housing 13 can be inserted into the link segments of housing 1. The armoring link segments 2, 3, secure by clamping both battery terminal element 5 and housing 13 of active element 14 so as to allow a defined free travel space to be created between isolating point 11 and disconnect element 7. In order to provide secure attachment and mechanical load relief from bending vibrations, a defined enlarged segment is added to the conductor of battery terminal element 5 at site 6. To attach the complete system, a generally known clamping device 12 is provided that securely retains the complete pyromechanical battery pole disconnect element on the positive terminal post of the battery. One-piece battery terminal element 5 has an electrical support screw 5 as a second attachment element 10 on the second arm 15b, which screw maintains the electrical power supply for emergency power systems even in the event of a disconnect, and has an attachment hole as the first attachment element 9 on the arm 15a of the battery terminal clamp that is electrically isolated from the pole terminal as a result of the destruction of isolating point 11.

Figure 2:
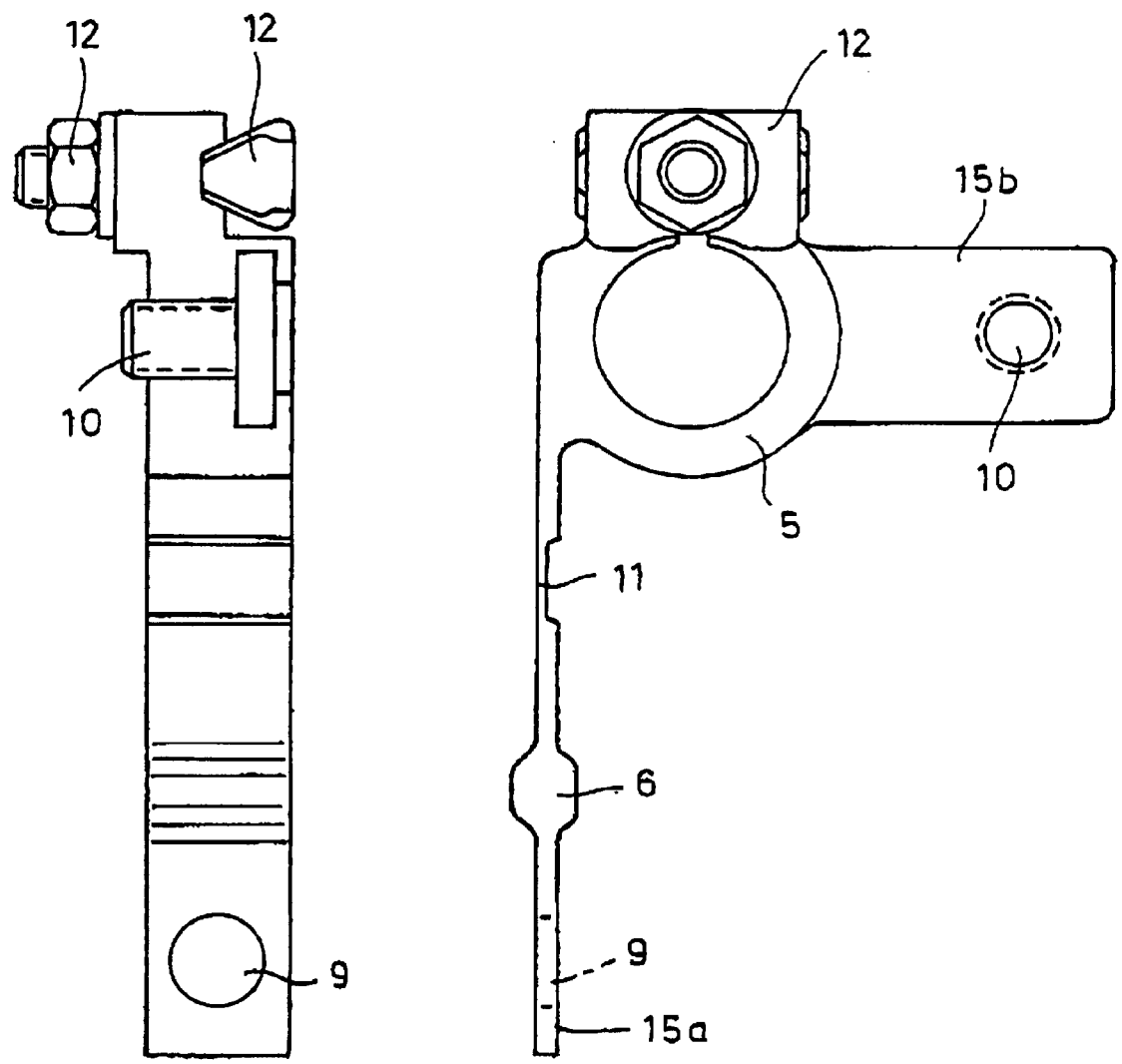
FIG. 2 slows front and side views of the one-piece battery terminal element of the pyromechanical battery pole disconnect element.

In order to further elucidate the arrangement, FIG. 2 shows the metallic complete one-piece battery terminal element 5 along with support point 10, clamping device 12, isolating point 11, enlarged segment 6 to prevent the separated end of the arm from sliding out, and power supply hole 9 to which the main power cable can be connected.

Figure 3:
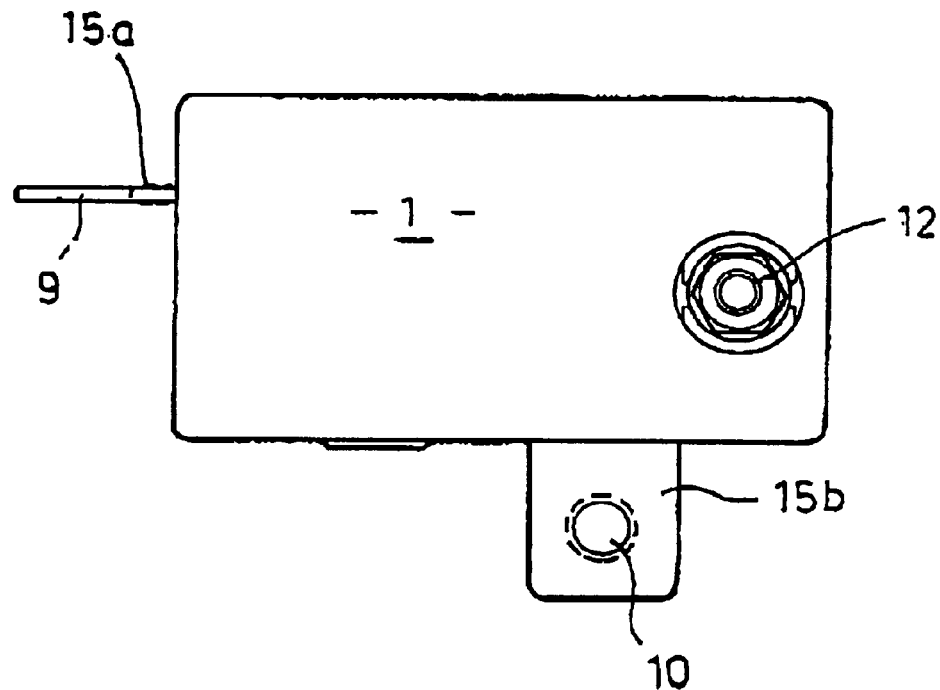
FIG. 3 shows the complete external form of the pyromechanical battery pole disconnect element seen from the top and side.
Figure 3:
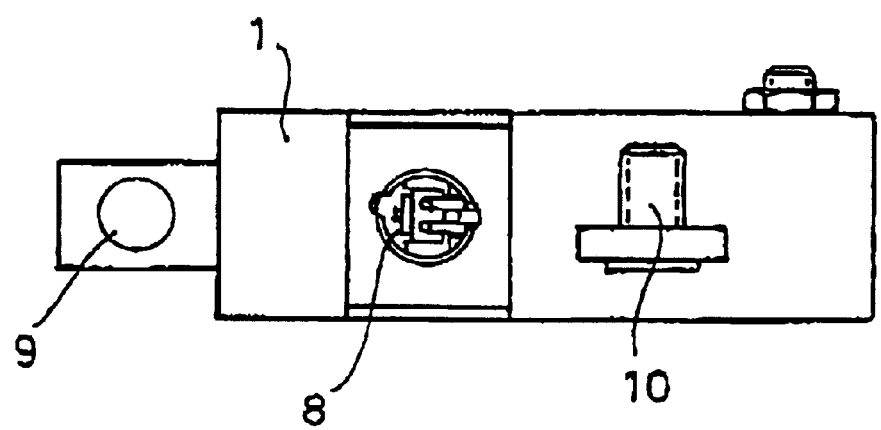

FIG. 3 shows the complete external form of the pyromechanical battery pole disconnect element with terminal 9, electrical support point 10 of clamping device 12, and the electrical ignition plug connection 8.

Function: The complete pyromechanical battery pole disconnect element is mounted on the terminal post of the battery using clamping screw 12 in a manner analogous to a collet. At electrical support point 10, a variety of loads can be electrically connected by cable lugs. The load to be disconnected may be connected to the terminal lug or hole 9. The ignition plug connector coming from the sensor system is plugged in at connector plug input 8 of pyromechanical disconnect 7. In the even of a crash, for example, in which the triggering sensor system responds to the vehicle crash signature, an electrical ignition current pulse is connected through to ignition plug connector input 8. Within disconnect element 7, a propulsive pressure builds up which accelerates the disconnect element and drives it onto isolating point 11. As a result of the high kinetic energy liberated upon impact with point 11, the bus bar is broken at this point and bent into the cavity 4 as shown in the drawing. The circuit from the battery through battery terminal 5 to terminal 9 is thus interrupted.

What is claimed is:

1. Pyromechanical battery pole disconnect element, comprising a housing in which an electrical conductor is located, a pyrotechnic active element including a breaking piston with a disconnect element to sever the electrical conductor at an isolating point, and a pyrotechnic charge to drive the disconnect element, characterized in that all the current-conducting components except the active element are combined to form a one-piece battery terminal element.

that the battery terminal element has a clamping device for connection to a battery terminal;

that two arms oriented at essentially right angles relative to each other extend from the clamping device;

that the isolating point is located on the first arm, and beyond the isolating point and opposite the clamping device an attachment element is located on this arm for connection to a system to be disconnected in an emergency, and;

that a second attachment element is located on the second arm for connection to the systems to be disconnected in an emergency.

2. Battery pole disconnect element according to claim 1, characterized in that the housing has bracing ribs and/or link segments, and that the battery terminal element and the active element inserted into these bracing ribs and/or link segments.

3. Battery pole disconnect element according to claim 1, characterized in that an enlarged segment is located on the first arm between the isolating point and the first attachment element.

4. Battery pole disconnect element according to claim 3, characterized in that the enlarged segment is located between ribs in the housing so as to prevent the separated end of the arm from falling out.

5. Battery pole disconnect element according to claim 1, characterized in that the second attachment element is a support screw.

6. Battery pole disconnect element according to claim 1, characterized in that the first attachment element is an attachment hole.

7. Battery pole disconnect element according to claim 1, characterized in that only the attachment elements protrude from the battery terminal element out of the housing.

8. Battery pole disconnect element according to claim 1, characterized in that the arms of the battery terminal element are ribbon-shaped.

9. Battery pole disconnect element according to claim 1, characterized in that the housing is fabricated out of a fiber-reinforced plastic.

* * * * *